(12) United States Patent
Kato et al.

(10) Patent No.: US 10,620,033 B2
(45) Date of Patent: Apr. 14, 2020

(54) LIQUID LEVEL DETECTING DEVICE

(71) Applicant: Yazaki Corporation, Tokyo (JP)

(72) Inventors: Shinpei Kato, Makinohara (JP); Shingo Nomoto, Makinohara (JP); Ryo Hirose, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 124 days.

(21) Appl. No.: 15/970,220

(22) Filed: May 3, 2018

(65) Prior Publication Data

US 2018/0348037 A1 Dec. 6, 2018

(30) Foreign Application Priority Data

Jun. 5, 2017 (JP) ................................. 2017-111087

(51) Int. Cl.
*G01F 23/38* (2006.01)
(52) U.S. Cl.
CPC ..................................... *G01F 23/38* (2013.01)
(58) Field of Classification Search
CPC ........................................................ G01F 23/38
See application file for complete search history.

(56) References Cited

U.S. PATENT DOCUMENTS

| | | | |
|---|---|---|---|
| 2004/0003660 | A1 | 1/2004 | Fukuhara et al. |
| 2008/0231267 | A1 | 9/2008 | Miyagawa et al. |
| 2018/0233976 | A1* | 8/2018 | Kuratani .................. H02K 1/30 |

FOREIGN PATENT DOCUMENTS

| | | |
|---|---|---|
| CN | 101271013 A | 9/2008 |
| CN | 206134408 U | 4/2017 |
| JP | 3-11712 A | 1/1991 |
| JP | 2004-37197 A | 2/2004 |
| JP | 3905707 B2 | 4/2007 |
| WO | 2006/076968 A1 | 7/2006 |

OTHER PUBLICATIONS

Communication dated May 28, 2019, issued by the Japanese Patent Office in counterpart Japanese Application No. 2017-111087.

* cited by examiner

*Primary Examiner* — Paul M. West
(74) *Attorney, Agent, or Firm* — Sughrue Mion, PLLC (57) ABSTRACT

A liquid level detecting device includes a sensor housing, a holder which is held rotatably by the sensor housing, a float arm which is fixed to the holder, a float which is attached to a tip portion of the float arm and varies in position following a surface level of liquid stored in a tank, a magnet provided in the holder, and a Hall element which is provided in the sensor housing and detects a displacement of the magnet of the holder. The magnet is a plastic magnet in which magnetic powder and a resin are mixed. A surface of the plastic magnet is coated by a coating layer.

4 Claims, 10 Drawing Sheets

LIQUID LEVEL DETECTING DEVICE

CROSS REFERENCE TO RELATED APPLICATIONS

This application is based on Japanese Patent Application (No. 2017-111087) filed on Jun. 5, 2017, the contents of which are incorporated herein by reference.

BACKGROUND OF THE INVENTION

1. Field of the Invention

The present invention relates to a liquid level detecting device.

2. Description of the Related Art

Liquid level detecting devices for detecting a level of a liquid stored in a tank are equipped with a device main body having a Hall element, a holder in which a magnet is provided so as to be rotatable with respect to the device main body, a float arm whose base portion is attached to the holder, and a float that is attached to a tip portion of the float arm (refer to JP-B-3905707, for example).

Incidentally, magnets used in liquid level detecting devices of the above kind are made of, for example, a rare-earth-based (Nd-based or Sm-based) material or ferrite. However, rare earth magnets are expensive and ferrite magnets are large in size because of weak magnetic fields they produce. One measure for solving these problems is to use, as a magnet that is relatively inexpensive and can be reduced in size, a plastic magnet that is manufactured by mixing a rare earth magnetic powder into a resin and molding a resulting mixture. However, under a highly corrosive environment, magnetic particles contained in such a magnet tend to rust to weaken the magnetic field it produces or cause a rotation failure of the holder, possibly resulting in lowering of the accuracy of detection of a liquid surface level.

SUMMARY OF THE INVENTION

The present invention has been made in view of the above circumstances, and an object of the invention is therefore to provide a liquid level detecting device that keeps high detection accuracy because its magnet is increased in corrosion resistance.

To attain the above object, the invention provides liquid level detecting devices of the following items (1) to (6):

(1) A liquid level detecting device including:
a sensor housing;
a holder which is held rotatably by the sensor housing;
a float arm which is fixed to the holder;
a float which is attached to a tip portion of the float arm and varies in position following a surface level of liquid stored in a tank;
a magnet provided in the holder; and
a Hall element which is provided in the sensor housing and detects a displacement of the magnet of the holder,
wherein the magnet is a plastic magnet in which magnetic powder and a resin are mixed; and
wherein a surface of the plastic magnet is coated by a coating layer.

(2) The liquid level detecting device according to item (1), wherein the magnet is embedded in the holder by an insert molding, and a part of the magnet is exposed from the holder.

(3) The liquid level detecting device according to item (2), wherein the magnet has an annular shape;
wherein a first positioning projection and a second positioning projection are provided on an outer circumference surface of the magnet to be retained to the holder; and
wherein the first positioning projection and the second positioning projection are embedded in the holder.

(4) The liquid level detecting device according to item (3), wherein the first positioning projection is larger in external shape than the second positioning projection.

(5) The liquid level detecting device according to item (3), wherein the first positioning projection and the second positioning projection are arranged so as to be biased toward one end surface of the magnet in an axial direction of the magnet; and
wherein the other end surface of the magnet which is opposite to the one end surface in the axial direction is exposed from the holder.

(6) The liquid level detecting device according to any one of items (1) to (5), wherein the coating layer is a plated layer that is formed on the surface of the plastic magnet.

In the liquid level detecting device having the configuration of item (1), the surfaces of the plastic magnet which is embedded in the holder are coated with the coating layer. By virtue of the presence of the coating layer, the magnet is given high corrosion resistance. As a result, reduction of the strength of the magnetic field produced by the magnet is suppressed and the holder continues to rotate satisfactorily, whereby high detection accuracy can be obtained.

In the liquid level detecting device having the configuration of items (2) to (5), since portions of the magnet where the coating layer is hard to form are formed in regions where the magnet is covered with the holder by insert molding, the corrosion resistance of the magnet can be increased reliably.

In the liquid level detecting device having the configuration of item (6), since the coating layer is a plated layer, the corrosion resistance of the magnet can be increased easily and reliably.

The invention makes it possible to provide a liquid level detecting device that keeps high detection accuracy because its magnet is increased in corrosion resistance.

The invention has been described above concisely. The details of the invention will become more apparent when the modes for carrying out the invention (hereinafter referred to as an embodiment) described below are read through with reference to the accompanying drawings.

DETAILED DESCRIPTION OF THE EXEMPLARY EMBODIMENTS

Figure 1:
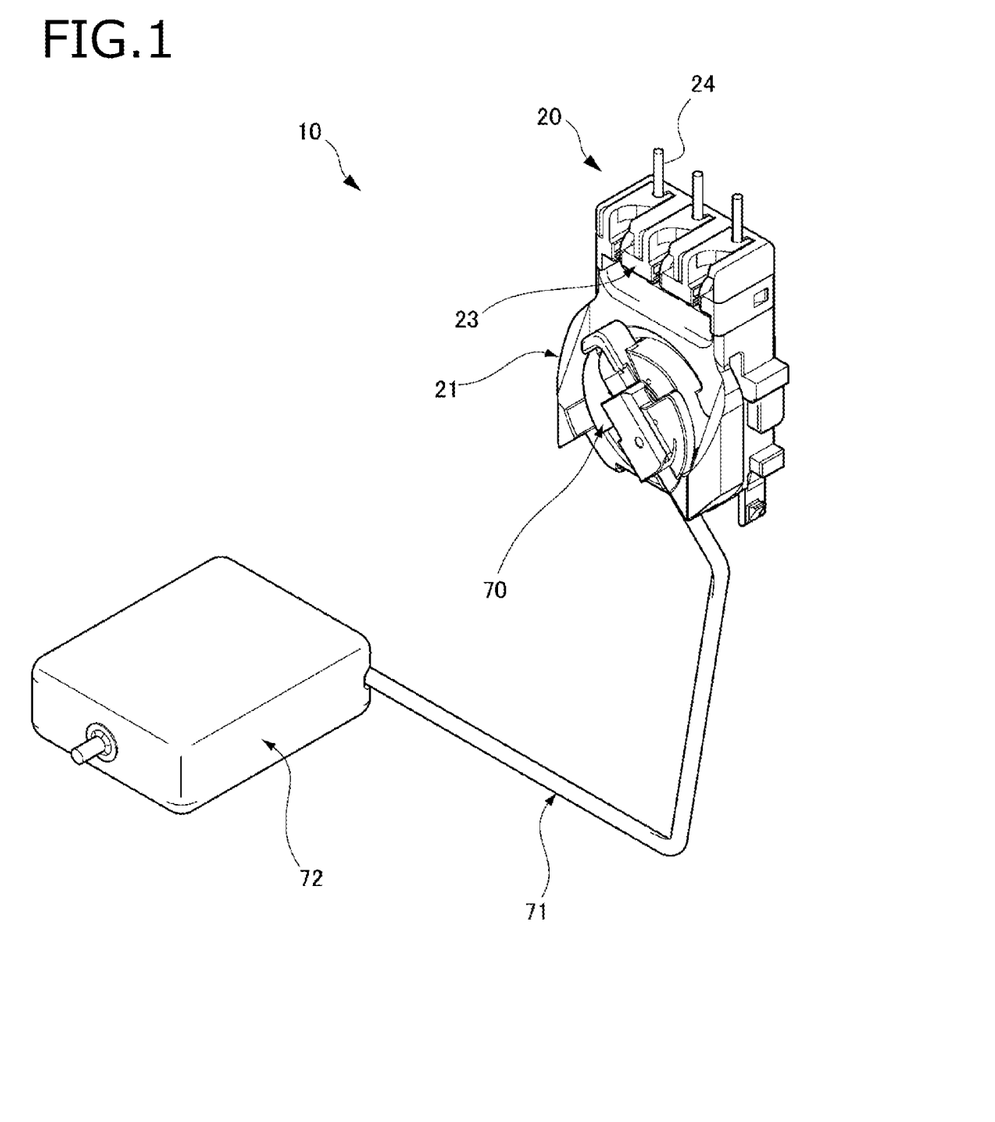
FIG. 1 is a perspective view of the whole of a liquid level detecting device according to an embodiment of the present invention.
Figure 2:
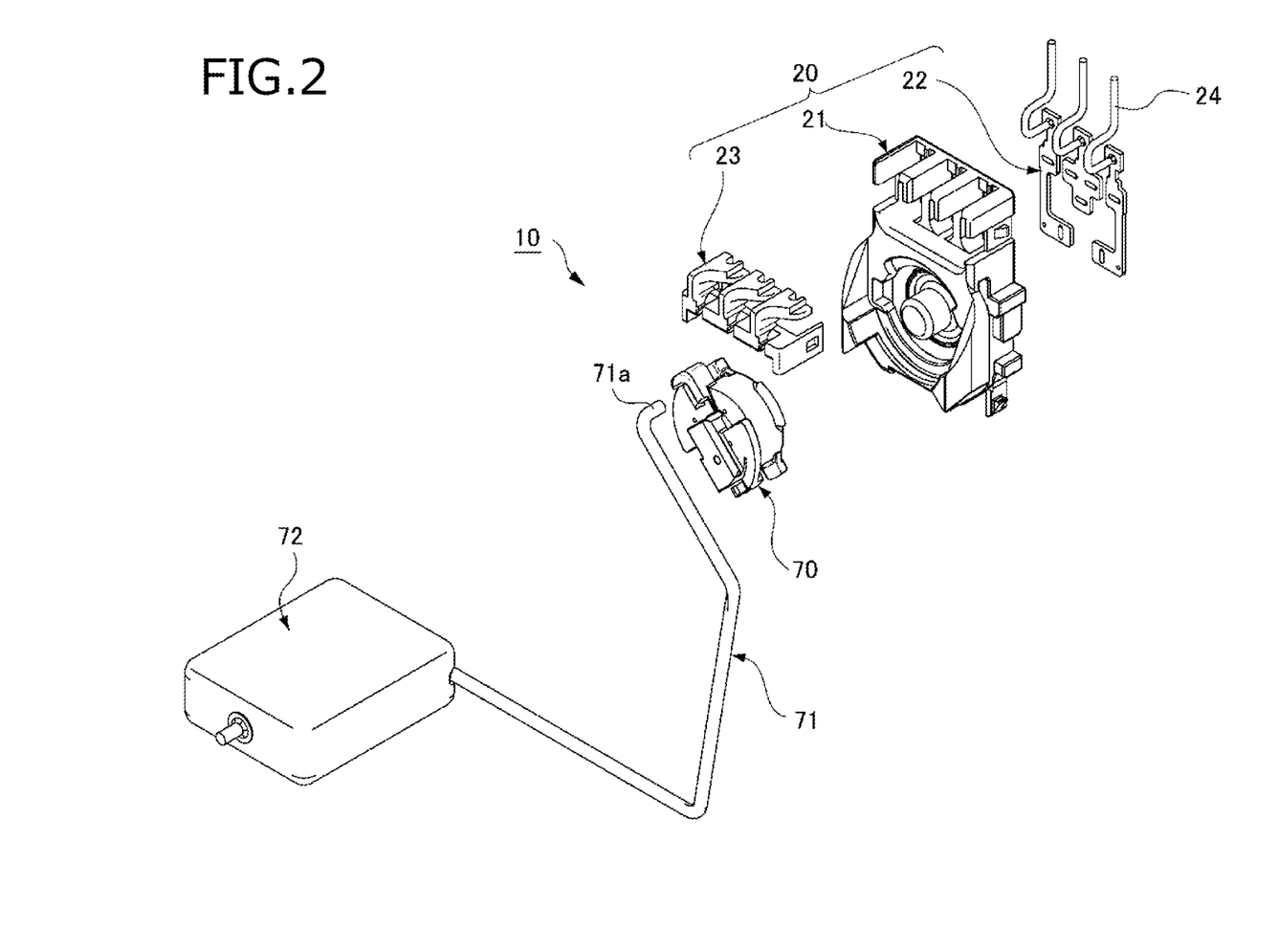
FIG. 2 is an exploded perspective view of the liquid level detecting device according to the embodiment.
Figure 3:
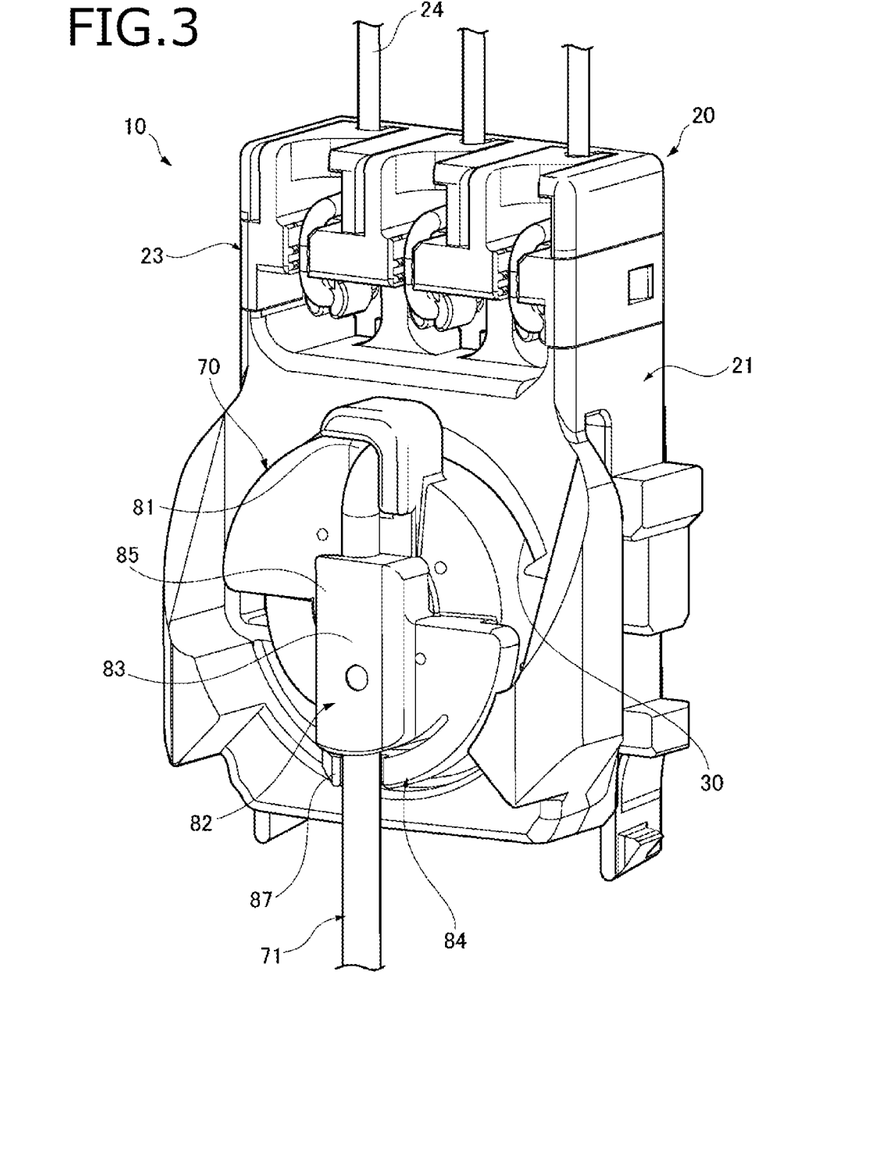
FIG. 3 is a perspective view of an essential part of the liquid level detecting device according to the embodiment.
Figure 4:
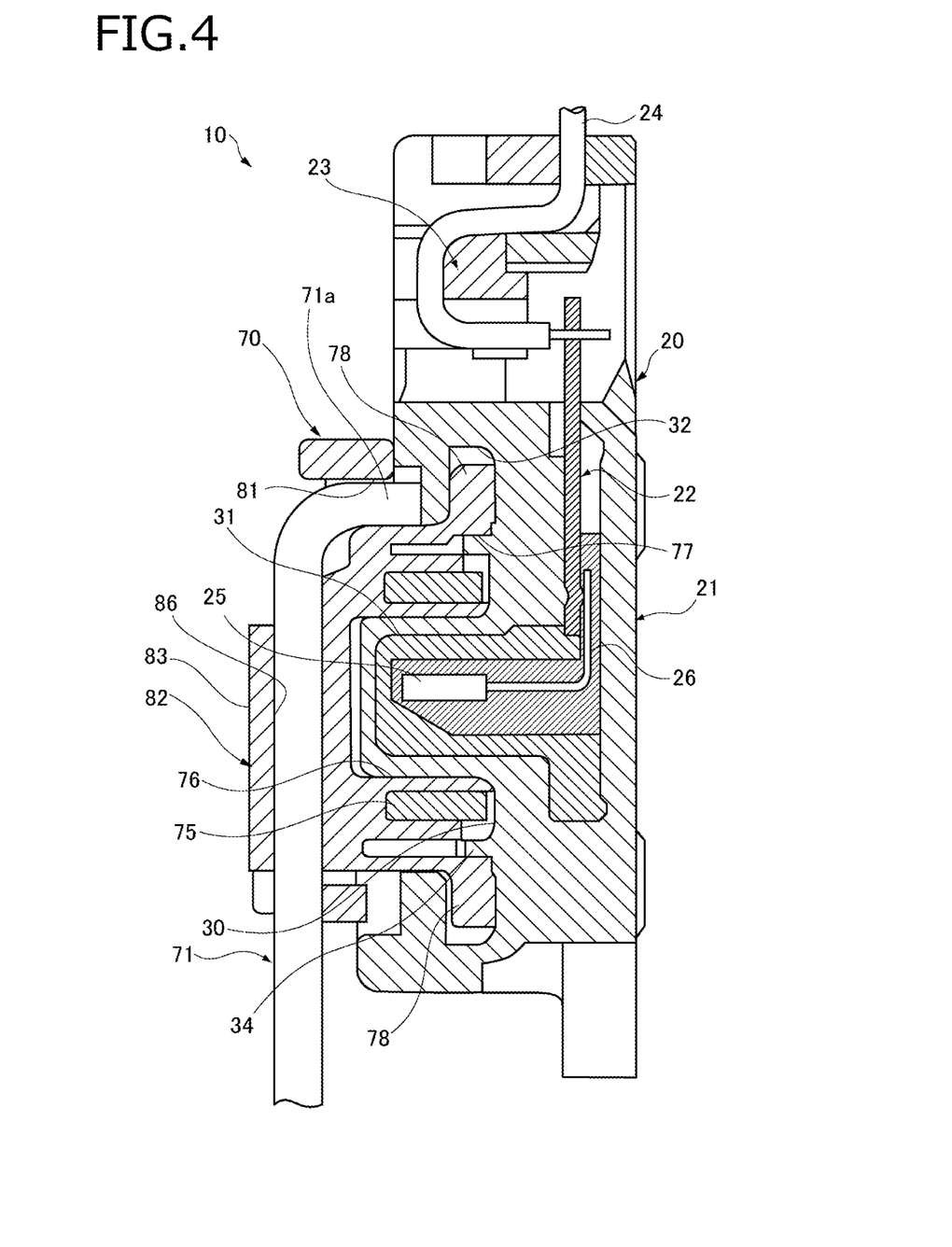
FIG. 4 is a sectional view of the liquid level detecting device according to the embodiment.

An embodiment of the present invention will be hereinafter described with reference to the drawings. FIG. 1 is a perspective view of the whole of a liquid level detecting device 10 according to the embodiment. FIG. 2 is an exploded perspective view of the liquid level detecting device 10. FIG. 3 is a perspective view of an essential part of the liquid level detecting device 10. FIG. 4 is a sectional view of the liquid level detecting device 10.

As shown in FIGS. 1 and 2, the liquid level detecting device 10 according to the embodiment is equipped with a device main body 20, a holder 70, a float arm 71, and a float 72. The device main body 20 is equipped with a sensor housing 21, a terminal 22, and a holding member 23.

As shown in FIGS. 3 and 4, the terminal 22 and the holding member 23 are attached to the sensor housing 21. A lead 26 of a Hall element 25 which is provided inside the sensor housing 21 is electrically connected to the terminal 22. Detection wires 24 which are held by the holding member 23 are connected to the terminal 22 and lead out from the top of the sensor housing 21.

A base portion of the float arm 71 is connected to the holder 70. The float 72 is fixed to the other end portion, which is a free end portion, of the float arm 71. The holder 70 which has a circular recessed portion and an annular shaped magnet 75 is attached into the recessed portion. The holder 70 is attached to a front portion of the sensor housing 21 and held by it rotatably.

The liquid level detecting device 10 is attached to an attachment target portion of, for example, a fuel tank that is installed in a vehicle such as an automobile, and detects a liquid level of a fuel stored inside the fuel tank.

In the liquid level detecting device 10, the float arm 71 swings as the float 72 moves in accordance with the liquid surface (liquid surface level). The holder 70 to which the float arm 71 is connected rotates with respect to the device main body 20. The Hall element 25 which is provided in the device main body 20 detects a variation of the magnetic flux generated by the magnet 75 which is provided in the holder 70 and a detection result is sent to a measuring unit through the detection wires 24. The measuring unit determines a liquid level based on the detection result received from the Hall element 25, and issues a warning if necessary. For example, the measuring unit issues a warning of a fuel shortage of the fuel tank.

Figure 5A:
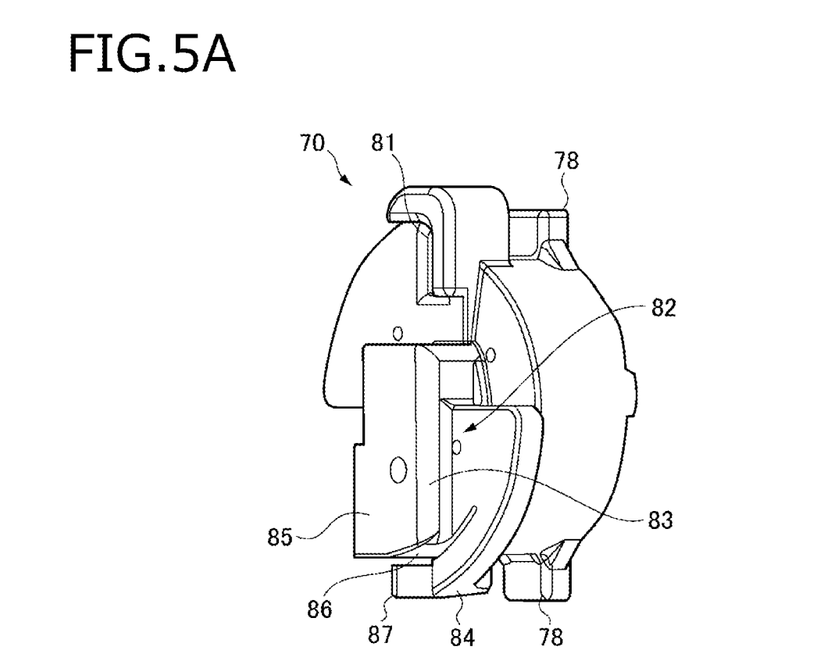
FIGS. 5A and 5B are perspective views, as viewed from the front side and the rear side, respectively, of a holder, and illustrate its structure.
Figure 5B:
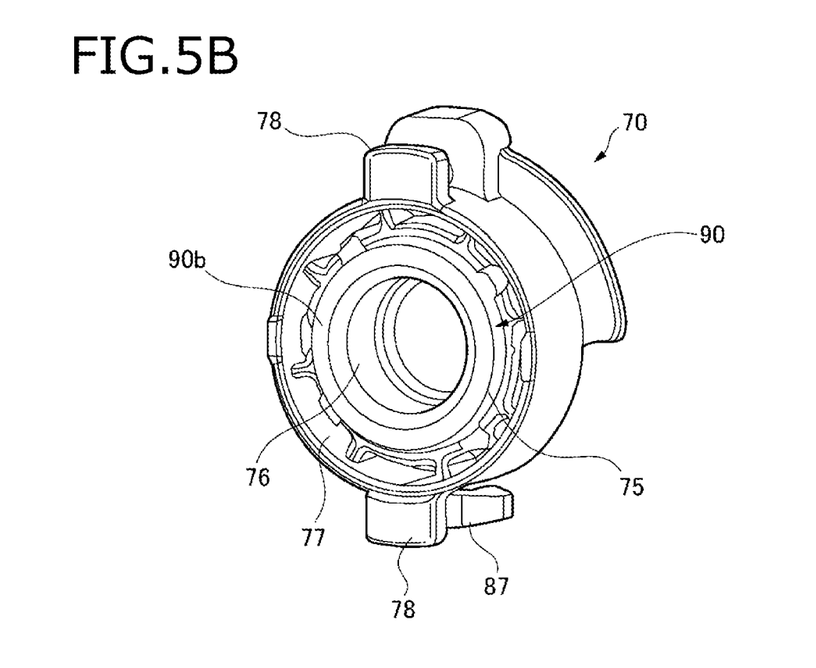

FIGS. 5A and 5B illustrate the structure of the holder 70. FIGS. 5A and 5B are perspective views, as viewed from the front side and the rear side, respectively, of the holder 70.

As shown in FIG. 5A, the holder 70 has an arm fixing portion 82 on the front side. The float arm 71 is fixed to the holder 70 by the arm fixing portion 82. The arm fixing portion 82 has a lock hole 81, a holding portion 83, and a lock portion 84. The lock hole 81 is formed in a portion, located on the circumference, of the holder 70. The base portion (one end portion) of the float arm 71 has a lock end portion 71a which is bent at a right angle and inserted in the lock hole 81 (see FIG. 4).

The holding portion 83 has a holding piece 85 which projects sideways, and a holding groove 86 is formed between the holding piece 85 and a front surface of the holder 70. A portion, in the vicinity of its base-side end, of the float arm 71 is fitted into the holding groove 86 from the side. The lock portion 84 is formed in the holding portion 83 on the side opposite to the lock hole 81. The lock portion 84 which is a flexible arm has, as a tip portion, a nail 87 which projects toward the front side of the holder 70. The nail 87 is locked on a circumferential surface of the float arm 71 that is fitted in the holding groove 86 of the holding portion 83.

As shown in FIG. 5B, the holder 70 has an axial recess 76 at its center on the rear side. The circular-ring-shaped magnet 75 is disposed outside the axial recess 76. The holder 70 is formed with a guide recess 77 on the rear side outside the magnet 75. The holder 70 also has a pair of brims 78 at top and bottom positions on its circumference on the rear side. The brims 78 project outward in opposite radial directions.

Figure 6:
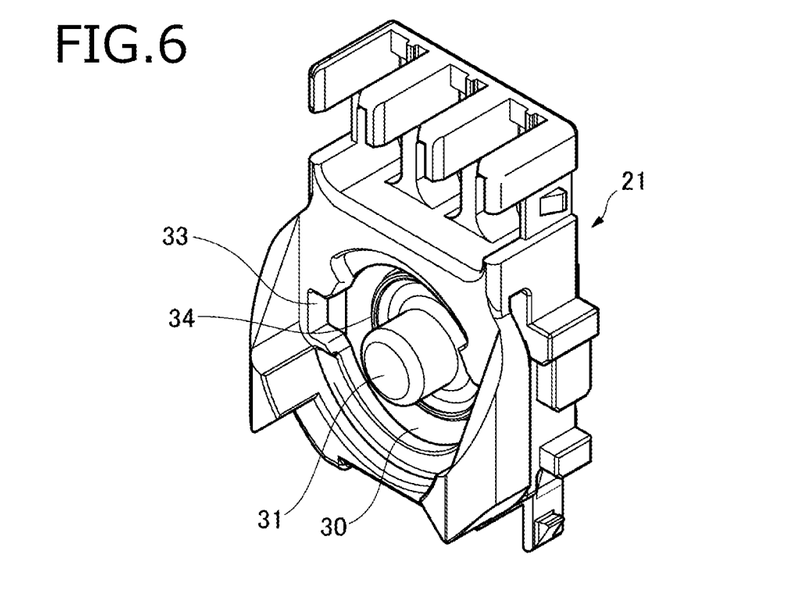
FIG. 6 is a perspective view of a sensor housing.
Figure 7:
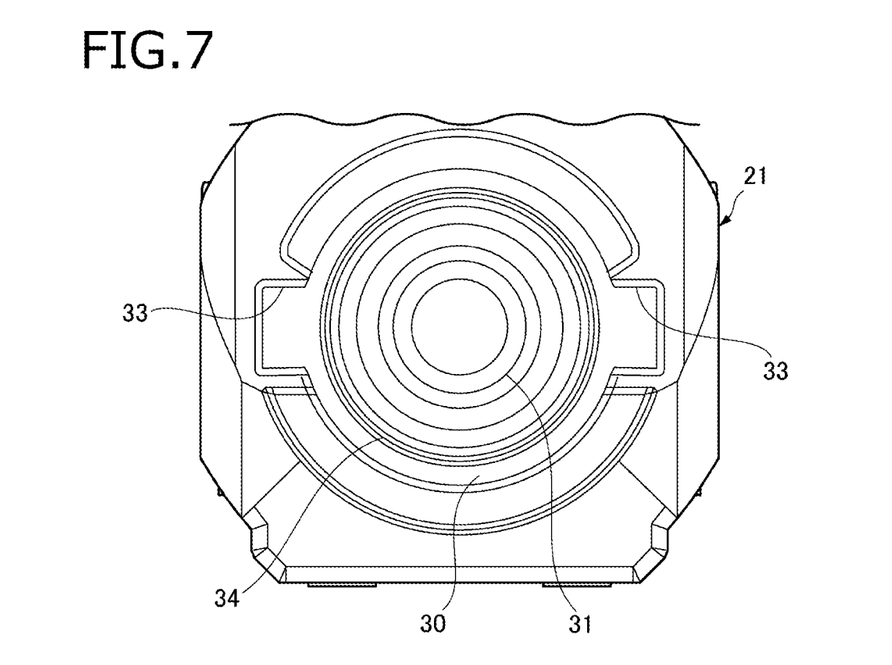
FIG. 7 is a front view of part of the sensor housing.

FIG. 6 is a perspective view of the sensor housing 21. FIG. 7 is a front view of part of the sensor housing 21.

As shown in FIGS. 6 and 7, the sensor housing 21 of the device main body 20 has, on the front side, a circular rotation recess 30 in which the holder 70 is set rotatably. A shaft portion 31 which is provided with the Hall element 25 projects at the center in the rotation recess 30. In the sensor housing 21, a lock groove 32 is formed over the full circumference adjacent to an outside portion of the rotation recess 30. The sensor housing 21 is formed with a pair of insertion holes 33 on the front side at opposite positions (i.e., left and right positions) on the circumference of the rotation recess 30. The insertion holes 33 communicate with the lock groove 32. A guide projection strip 34 is formed over the full circumference at the bottom of the rotation recess 30 so as to surround the shaft portion 31.

To attach the holder 70 to the sensor housing 21, the brims 78 of the holder 70 are set opposed to the respective insertion holes 33 of the sensor housing 21 and then the holder 70 is fitted into the rotation recess 30. As a result, the brims 78 are inserted through the respective insertion holes 33 and the shaft portion 31 of the sensor housing 21 is inserted into the axial recess 76 of the holder 70. And the guide projection strip 34 of the sensor housing 21 goes into the guide recess 77 of the holder 70.

Subsequently, the holder 70 that is fitted in the rotation recess 30 is rotated so that the lock hole 81 will be located at the top. As a result, the brims 78 of the holder 70 go into the lock groove 32 of the sensor housing 21, whereby the holder 70 is prevented from coming off the rotation recess 30 of the sensor housing 21.

Figure 8:
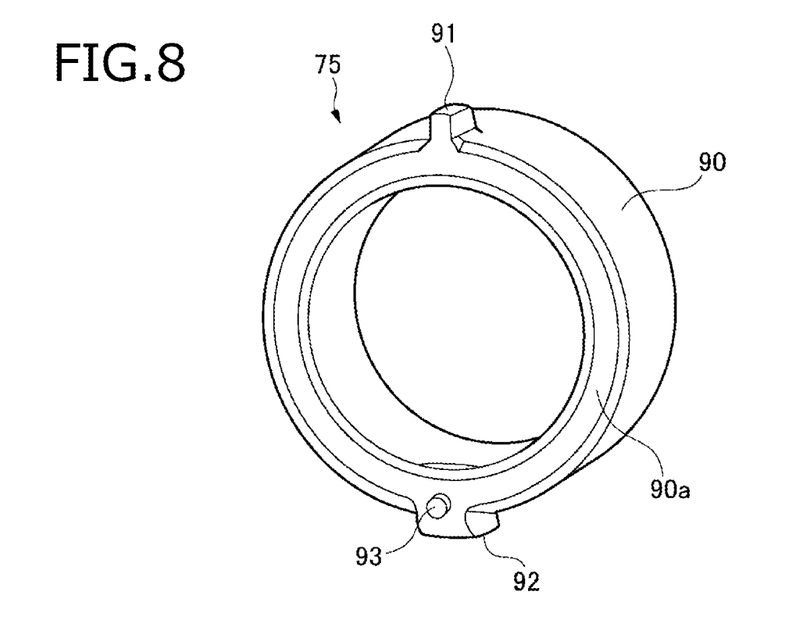
FIG. 8 is a perspective view of a magnet.
Figure 9A:
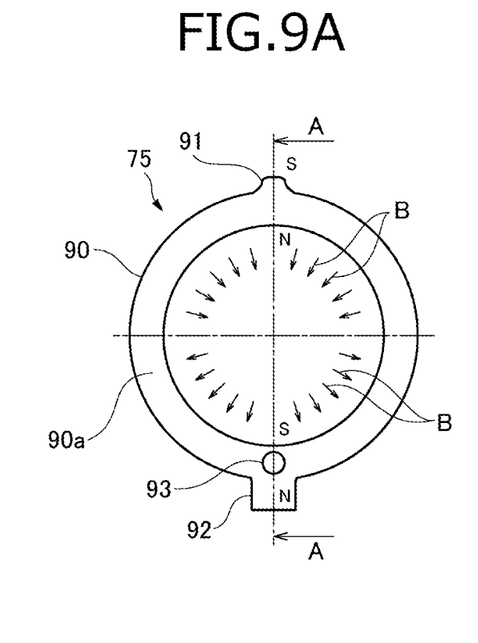
FIG. 9A is a front view of the magnet and FIG. 9B is a side view of the magnet.
Figure 9B:
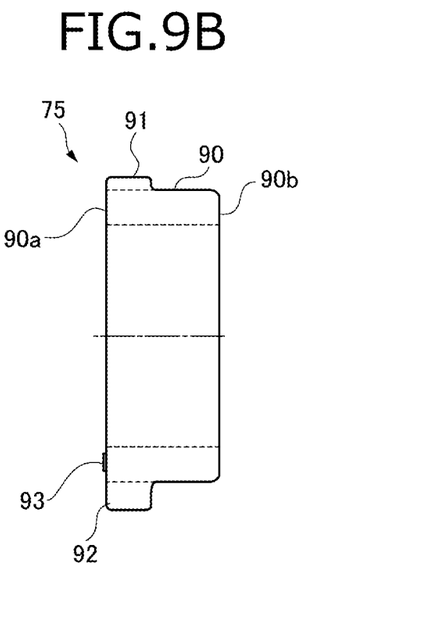
Figure 10:
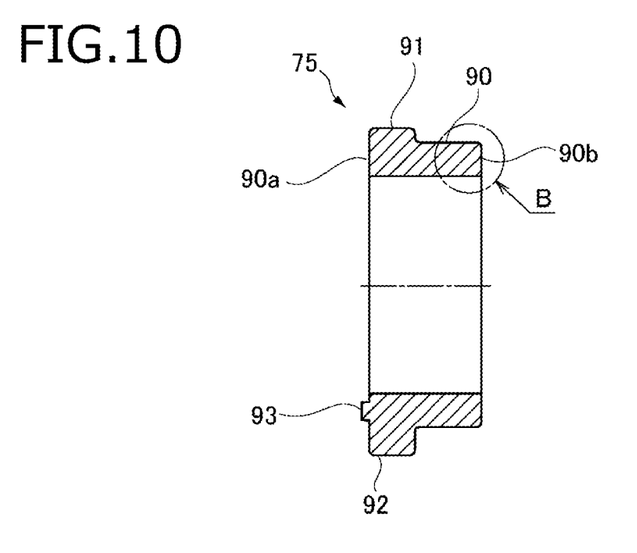
FIG. 10 is a sectional view taken along line A-A in the left-hand figure of FIG. 9A.

FIG. 8 is a perspective view of the magnet 75. FIG. 9A is a front view of the magnet and FIG. 9B is a side view of the magnet. FIG. 10 is a sectional view taken along line A-A in the left-hand figure of FIG. 9A.

As shown in FIGS. 8-10, the magnet 75 which is provided in the holder 70 has a circular-ring-shaped magnet main body 90 and two positioning projections 91 and 92. The positioning projections 91 and 92 are formed on the outer circumferential surface of the magnet main body 90. The positioning projections 91 and 92 are located closer to one end, in the axial direction, of the magnet main body 90 than to its other end. The positioning projection 92 is larger in external shape than the positioning projection 91.

For example, the magnet 75 is a plastic magnet manufactured by mixing a rare-earth-based (Nd-based or Sm-based), ferrite-based, or Sm—Co-based magnetic powder into a resin, molding a resulting mixture, and magnetizing a resulting mold. Around the projection 91, the magnet 75 has an S pole on the outer surface side and an N pole on the inner surface side. Around the projection 92, the magnet 75 has an N pole on the outer surface side and an S pole on the inner surface side. A magnetic flux B is formed between the inside S pole and the inside N pole of the magnet 75. The magnet 75 has a gate mark 93 at the position of a gate through which resin was charged into the cavity of a molding die. The gate mark 93 is formed on one end surface 90a, in the axial direction, of the magnet main body 90 at the same circumferential position as the positioning projection 92.

Figure 11:
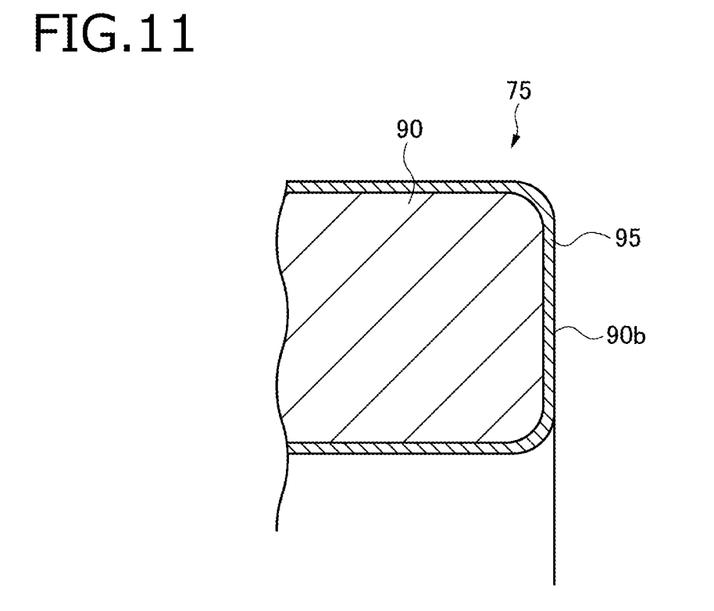
FIG. 11 is an enlarged view of part B of FIG. 10.

FIG. 11 is an enlarged view of part B of FIG. 10. As shown in FIG. 11, the magnet 75 has a coated surface, more specifically, a coating (plated) layer 95 formed by plating. To form the coating (plated) layer 95, first, the surfaces of an original body of the magnet 75 are subjected to polishing. Subsequently, electroless plating is performed to form a primer layer and then a plated layer is formed by electroplating. This process makes it possible to form a good plated layer on even a non-conductive original body of the magnet 75.

Examples of the plated layer are an Sn layer, an Ni layer, and an Sn—Ni alloy layer which are high is corrosion resistance. Selection is made from such plated layers according to an environment where the liquid level detecting device 10 is installed. The coating (plated) layer 95 needs to be so thick (For example, 5 μm or more) as to cover magnetic particles sufficiently that are exposed from the surface. The coating layer 95 may be formed by a method other than plating, such as evaporation of a resin or a metal.

The magnet 75 is integrated embedded in the holder 70 by insert molding. To mold a holder 70 incorporating the magnet 75 by insert molding, first, the magnet 75 is set in a molding die (not shown). At this time, the magnet 75 is positioned at a prescribed position with respect to the molding die using the positioning projections 91 and 92. Subsequently, a holder 70 is molded by injecting a resin into the cavity of the die. As a result, the magnet 75 is inserted in the resulting holder 70 in such a manner that its magnetic poles are arranged in the prescribed direction.

Figure 12:
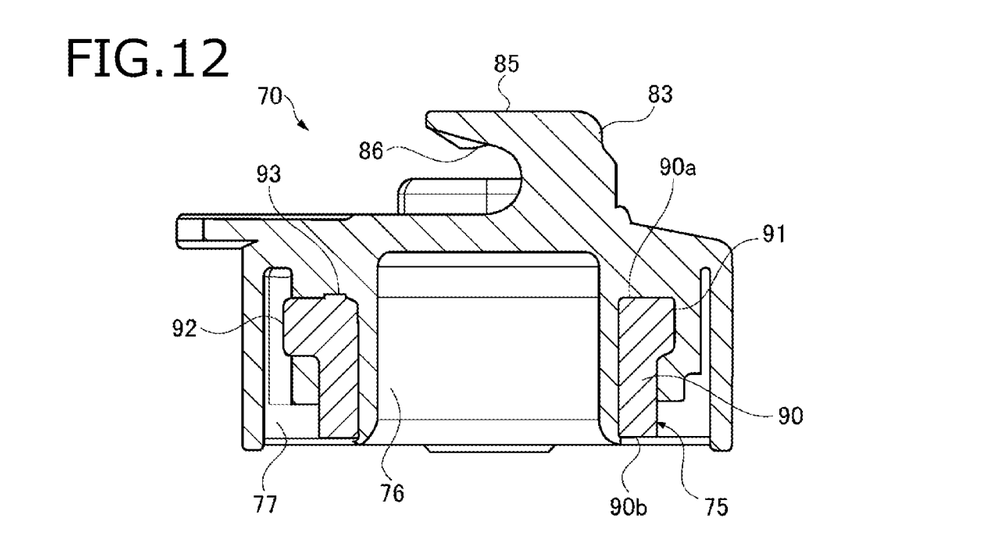
FIG. 12 is a horizontal sectional view of the holder.

FIG. 12 is a horizontal sectional view of the holder 70. As shown in FIG. 12, as for the magnet 75 which is integrated with the molded holder 70, the inner circumferential surface of the magnet main body 90, an end surface 90a, located on one side in the axial direction and having the gate mark 93, of the magnet main body 90, and a portion, located on the one side in the axial direction, of the outer circumferential surface of the magnet main body 90 are covered with the holder 70 which is made of a resin. The positioning projection 91 and the surfaces excluding the outer projection end surface of the positioning projection 92 are also covered with the holder 70 which is made of a resin. As a result, as for the magnet 75, an end surface 90b, located the other side in the axial direction, of the magnet main body 90 and the portion, located the other side in the axial direction, of the outer circumferential surface of the magnet main body 90 are exposed.

To suppress corrosion of the magnet 75, it is preferable that the holder 70 having the magnet 75 be formed by double molding so as to cover the magnet 75 in its entirety with a resin. However, if the magnet 75 is covered in its entirety with a resin, not only is the holder 70 increased in size but also the positional relationship between the Hall element 25 and the magnet 75 may deviate due to expansion or contraction of the resin holder 70 caused by heat or the like or swelling with fuel, possibly resulting in reduction of the accuracy of detection of a liquid surface level.

In view of the above, in the magnet 75 employed in the embodiment, the end surface 90b, located the other side in the axial direction, of the magnet main body 90 and the portion, located the other side in the axial direction, of the outer circumferential surface of the magnet main body 90 are exposed. Even if these portions of the magnet 75 are exposed, the magnet 75 is given high corrosion resistance because the surfaces of its original body are coated with the coating layer 95.

As described above, in the liquid level detecting device 10 according to the embodiment, the surfaces of the original body of the magnet 75 which is a plastic magnet and is incorporated in the holder 70 are coated with the coating layer 95. By virtue of the presence of the coating layer 95, the magnet 75 is given high corrosion resistance. As a result, reduction of the strength of the magnetic field produced by the magnet 75 is suppressed and the holder 70 continues to rotate satisfactorily, whereby high detection accuracy can be obtained.

Furthermore, in the liquid level detecting device 10 according to the embodiment, the holder 70 is insert-molded with the magnet 75 and the magnet 75 is partially covered with the holder 70. The corrosion resistance of the magnet 75 can be increased reliably by forming, in the regions where the magnet 75 is covered with the holder 70, its portions where the coating layer 95 is hard to form such as the gate mark 93 and corner portions between the magnet main body 90 and the positioning projections 91 and 92.

In particular, since the coating layer 95 is a plated layer, the corrosion resistance of the magnet 75 can be increased easily and reliably.

Figure 13:
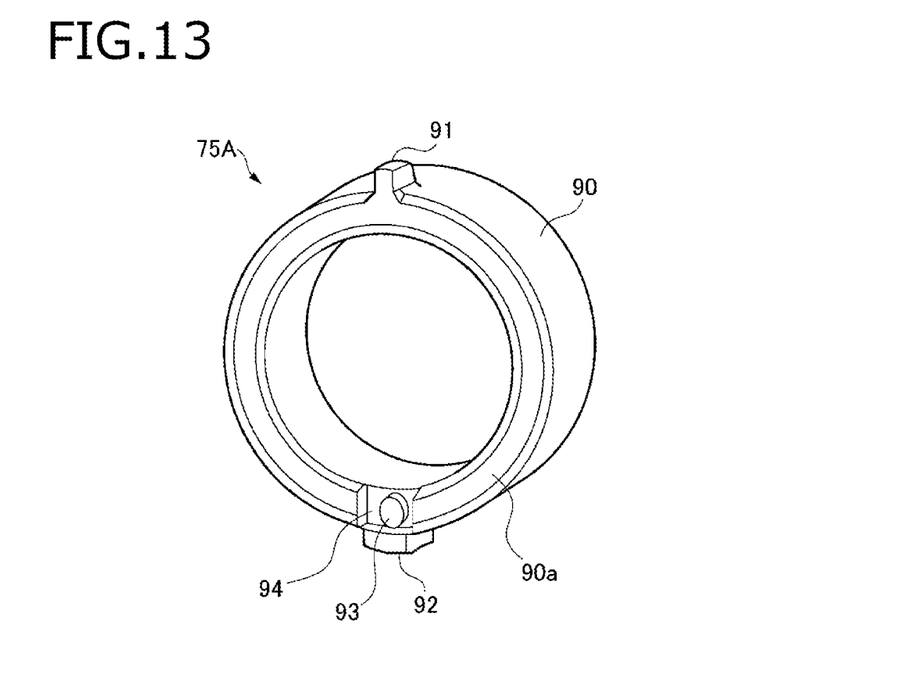
FIG. 13 is a perspective view of a magnet according to a modification.
Figure 14:
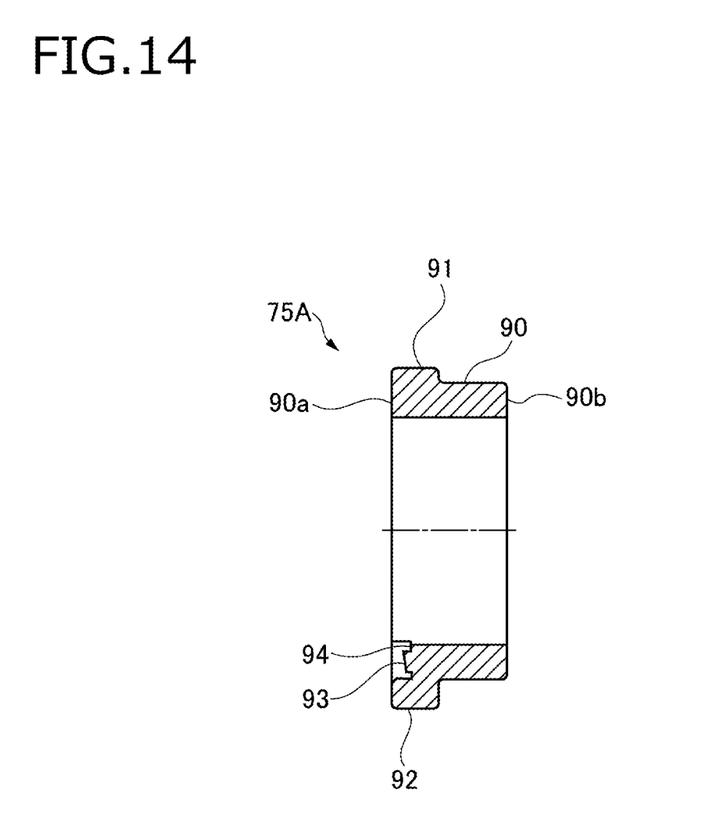
FIG. 14 is a sectional view, taken along a line corresponding to line A-A in FIG. 9A, of the magnet according to the modification.

Next, a magnet 75A according to a modification will be described. FIG. 13 is a perspective view of the magnet 75A according to the modification. FIG. 14 is a sectional view, taken along a line corresponding to line A-A in FIG. 9A, of the magnet 75A according to the modification.

As shown in FIGS. 13 and 14, in the magnet 75A according to the modification, to prevent the gate mark 93 from projecting from the level of the end surface 90a, a recess 94 is formed in a portion where the gate mark 93 is formed. By setting a gate through which to charge resin at a position behind the position where the end surface 90a is to be formed, stress concentration there can be in resin suppressed when the holder 70 is insert-molded. However, where the magnet 75A is formed with the recess 94, it is difficult to form a coating (plated) layer 95 in the recess 94.

Even in this modification, since the entire end surface 90a of the magnet 75A including the recess 94 in which the gate mark 93 is formed is covered with the resin holder 70, corrosion resistance can be increased reliably even in the recess 94.

The invention is not limited to the above embodiment and various modifications, improvements, etc. can be made as appropriate. The materials, shapes, sets of dimensions, numbers, locations, etc. of the respective constituent elements of the above embodiment are not limited to those disclosed but can be determined in desired manners as long as the invention can be implemented.

Features of the liquid level detecting device 10 according to the embodiment of the invention will be summarized concisely below in the forms of items [1] to [6]:

[1] A liquid level detecting device (10) including:
a sensor housing (21);

a holder (70) which is held rotatably by the sensor housing (21);
a float arm (71) which is fixed to the holder (70);
a float (72) which is attached to a tip portion of the float arm (71) and varies in position following a surface level of liquid stored in a tank;
a magnet (75) provided in the holder (70); and
a Hall element (25) provided in the sensor housing (21) and detects a displacement of the magnet (75) of the holder (70),
wherein the magnet (75) is a plastic magnet in which magnetic powder and a resin are mixed; and
wherein a surface of the plastic magnet is coated by a coating layer (95).

[2] The liquid level detecting device (10) according to item [1], wherein the magnet (75) is embedded in the holder (70) by an insert molding, and a part of the magnet (75) is exposed from the holder (70).

[3] The liquid level detecting device (10) according to item [2], wherein the magnet (75) has an annular shape, a first positioning projection (92) and a second positioning projection (91) are provided on an outer circumference surface of the magnet (75) to be retained to the holder (70), and the first positioning projection (92) and the second positioning projection (91) are embedded in the holder (70).

[4] The liquid level detecting device (10) according to item [3], wherein the first positioning projection (92) is larger in external shape than the second positioning projection (91).

[5] The liquid level detecting device (10) according to item [3], the first positioning projection (92) and the second positioning projection (91) are arranged so as to be biased toward one end surface of the magnet (75) in an axial direction of the magnet (75), and the other end surface of the magnet (75) which is opposite to the one end surface in the axial direction is exposed from the holder (70).

[6] The liquid level detecting device (10) according to any one of items [1] to [5], wherein the coating layer (95) is a plated layer that is formed on the surface of the plastic magnet.

What is claimed is:

1. A liquid level detecting device comprising:
a sensor housing;
a holder which is held rotatably by the sensor housing;
a float arm which is fixed to the holder;
a float which is attached to a tip portion of the float arm and varies in position following a surface level of liquid stored in a tank;
a magnet provided in the holder; and
a Hall element which is provided in the sensor housing and detects a displacement of the magnet of the holder,
wherein the magnet is a plastic magnet in which magnetic powder and a resin are mixed;
wherein a surface of the plastic magnet is coated by a costing layer,
wherein the magnet is embedded in the holder by an insert molding, and a part of the magnet is exposed from the holder,
wherein the magnet has an annular shape;
wherein a first positioning projection and a second positioning projection are provided on an outer circumference surface of the magnet to be retained to the holder; and
wherein the first positioning projection and the second positioning projection are embedded in the holder.

2. The liquid level detecting device according to claim 1, wherein the first positioning projection is larger in external shape than the second positioning projection.

3. The liquid level detecting device according to claim 1, wherein the first positioning projection and the second positioning projection are arranged so as to be biased toward one end surface of the magnet in an axial direction of the magnet; and
wherein the other end surface of the magnet which is opposite to the one end surface in the axial direction is exposed from the holder.

4. The liquid level detecting device according to claim 1, wherein the costing layer is a plated layer that is formed on the surface of the plastic magnet.

* * * * *